US008555387B2

(12) United States Patent
Lee et al.

(10) Patent No.: US 8,555,387 B2
(45) Date of Patent: Oct. 8, 2013

(54) APPARATUS AND METHOD FOR PROTECTING ASSET IN COMPUTER SYSTEM

(75) Inventors: Yun Koo Lee, Daejeon (KR); Sang Woon Yang, Daejeon (KR); Jae Hwan Ahn, Daejeon (KR); Joung Chul Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 530 days.

(21) Appl. No.: 12/643,077

(22) Filed: Dec. 21, 2009

(65) Prior Publication Data

US 2010/0162397 A1    Jun. 24, 2010

(30) Foreign Application Priority Data

Dec. 23, 2008  (KR) .................... 10-2008-0132401

(51) Int. Cl.
 *G06F 11/00* (2006.01)
(52) U.S. Cl.
 USPC .............. 726/23; 726/25; 726/26; 713/152; 713/165; 713/187
(58) Field of Classification Search
 None
 See application file for complete search history.

(56) References Cited

U.S. PATENT DOCUMENTS

| | | | |
|---|---|---|---|
| 6,026,502 A | 2/2000 | Wakayama | |
| 7,694,121 B2 * | 4/2010 | Willman et al. | ................... 713/2 |
| 2003/0196091 A1 | 10/2003 | Raley et al. | |
| 2005/0091488 A1 | 4/2005 | Dunbar et al. | |
| 2006/0031921 A1 * | 2/2006 | Danforth et al. | ................... 726/1 |
| 2010/0063996 A1 * | 3/2010 | Kanemura | .................... 709/203 |

FOREIGN PATENT DOCUMENTS

| | | |
|---|---|---|
| EP | 0 514 815 A2 | 11/1992 |
| EP | 1 076 279 A1 | 2/2001 |
| JP | 2006-018825 A | 1/2006 |
| JP | 2006-040196 A | 2/2006 |
| KR | 100571695 B1 | 4/2006 |
| KR | 10-0819942 B1 | 3/2008 |
| WO | 97/29425 A2 | 8/1997 |
| WO | 00/48063 A1 | 8/2000 |
| WO | 2008/004525 A1 | 1/2008 |

OTHER PUBLICATIONS

Andres Torrubia, et al; "Information Security in Multiprocessor Systems Based on the X86 Architecture", Computers & Security, vol. 19, No. 6, pp. 559-563, 2000 (No exact date on document found).
European Search Report: EP 09 18 0202 dated Apr. 6, 2010.

* cited by examiner

*Primary Examiner* — Shewaye Gelagay
(74) *Attorney, Agent, or Firm* — Ladas & Parry LLP

(57) ABSTRACT

Provided are an apparatus and method using spatial and temporal quarantine expansion to prevent important information from being leaked due to attacks such as viruses, hacking, and the like. The apparatus includes a state change unit for changing a state of at least one of a memory, a register, and a port in the computer system; a state calculation unit for calculating information on the changed state of the computer system; a security-threat-element elimination unit for eliminating security threat elements from the computer system; a communication unit for transmitting the state information calculated by the state calculation unit to the quarantine station, or receiving control information for controlling the computer system based on the state information, from the quarantine station; and a security execution unit for receiving security information from the quarantine station to execute a specific program when the computer system is faultless, wherein the state information and the control information are transmitted or received until the computer system is faultless repeatedly.

9 Claims, 3 Drawing Sheets

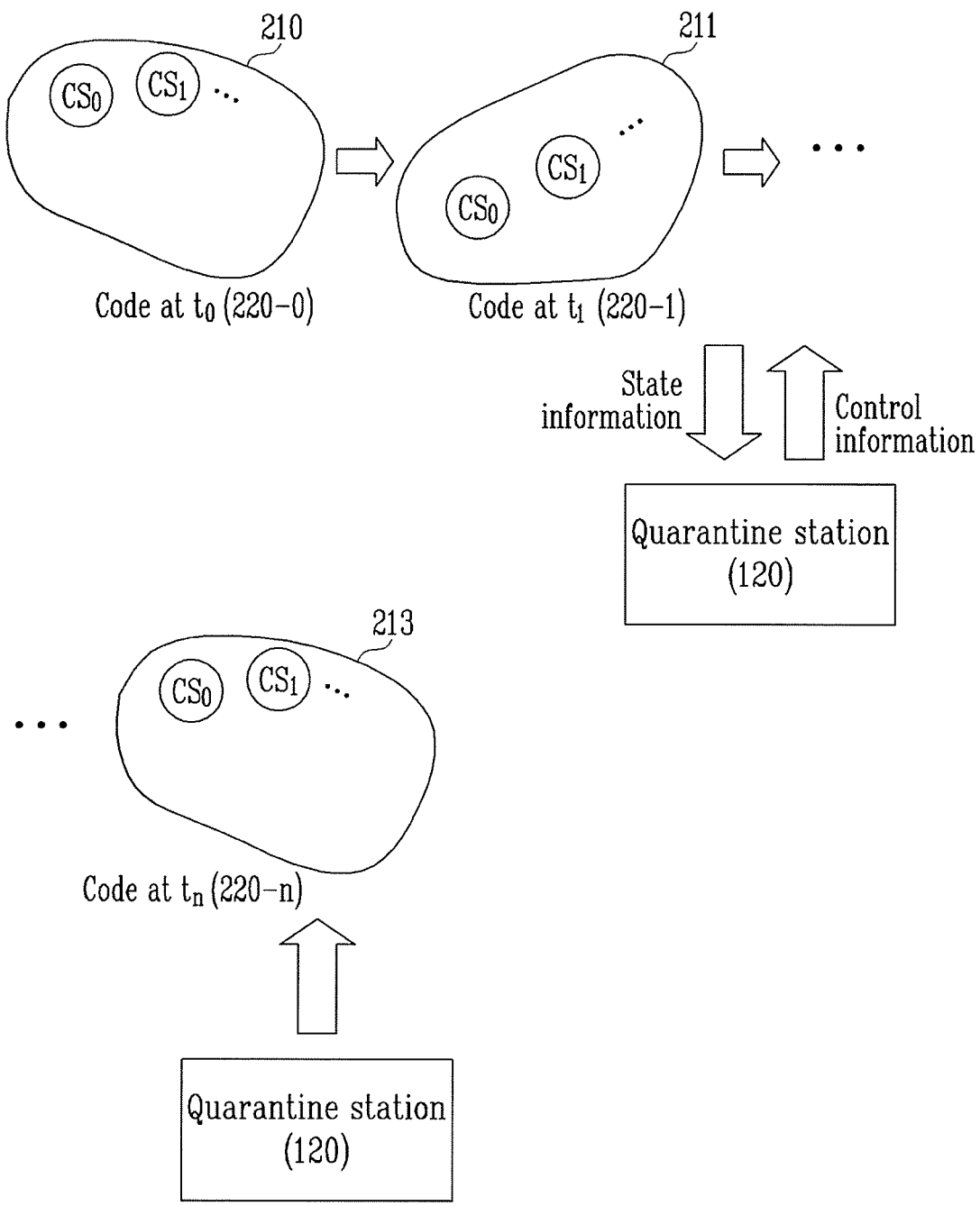

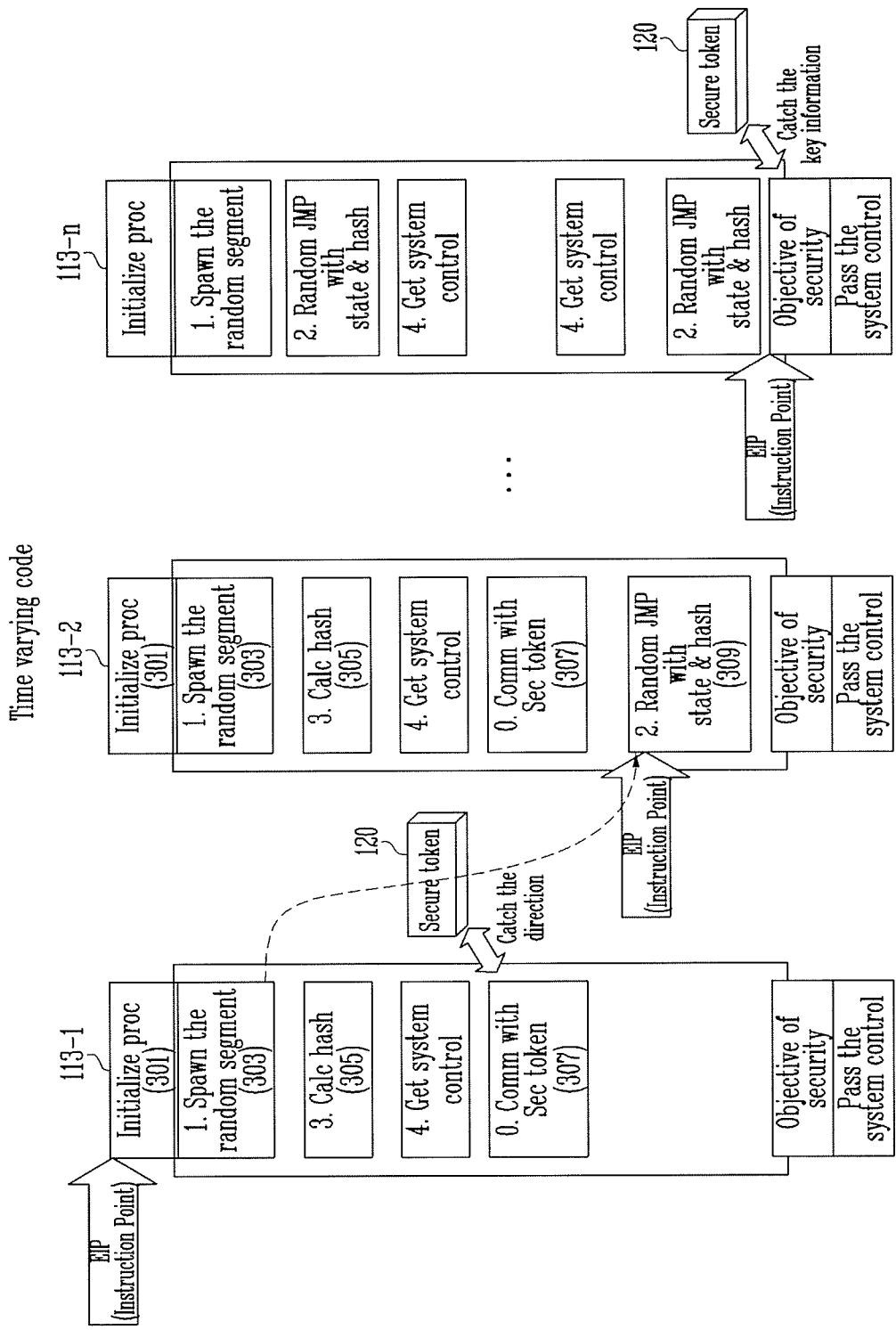

APPARATUS AND METHOD FOR PROTECTING ASSET IN COMPUTER SYSTEM

CROSS-REFERENCE TO RELATED APPLICATION

This application claims priority to and the benefit of Korean Patent Application No. 10-2008-0132401, filed Dec. 22, 2008, the disclosure of which is incorporated herein by reference in its entirety.

BACKGROUND

1. Field of the Invention

The present invention relates to an apparatus and method for preventing hacking to prevent important information from being leaked due to external attacks such as viruses, hacking, and the like in a computer system. More particularly, the present invention relates to an apparatus and method for preventing hacking by extending a secure quarantine station inside a computer system using an external or internal quarantine station with verified stability in the computer system.

2. Discussion of Related Art

Proliferation of computers and the Internet have increased viruses, worms and other malicious codes that destroy data and programs in the computers, and copies of commercially available programs. With the advent of Internet banking, financial mishaps due to hacking are also on the rise. Also, copyright infringements such as illegally copying and executing contents of cellular phones or game machines are becoming more frequent.

Accordingly, schemes for preventing copying and hacking of software due to external attacks have been developed.

Obfuscation, code encryption, lexical conversion, and the like have been proposed as conventional schemes for preventing copying and hacking of software.

The schemes make it difficult to hack software and important information by converting codes having a simple pattern created by a compiler into codes that are complex or difficult to use with conventional analysis tools.

However, such hacking protection schemes do not provide perfect hacking protection. This is because all important information must be essentially handled by a host. Specifically, all processes need a central processing unit (CPU). Accordingly, when a hacking program gets an occupation right of the CPU, the core information is highly likely to be leaked.

Accordingly, there is a need for a scheme capable of essentially preventing hacking due to fundamental architecture of computer device.

SUMMARY OF THE INVENTION

The present invention is directed to an apparatus and method for preventing hacking that are capable of securely protecting important information from attacks such as virus and hacking.

The present invention is also directed to an apparatus and method for preventing hacking that are capable of protecting important information by producing a secure quarantine area inside a processor using an external or internal secure quarantine station.

One aspect of the present invention provides an apparatus for preventing hacking in a computer system having a processor, the apparatus including: a quarantine station with guaranteed safety; and a quarantine-station extension unit for implementing a state in which attacks are impossible in the processor using the quarantine station.

The quarantine-station extension unit includes: a state change unit for changing a state of at least one of a memory, a register, and a port in the computer system; a state calculation unit for calculating information on the changed state of the computer system; a security-threat-element elimination unit for eliminating security threat elements from the computer system; a communication unit for transmitting the state information calculated by the state calculation unit to the quarantine station, and receiving control information for controlling the computer system based on the state information, from the quarantine station; and a security execution unit for receiving security information from the quarantine station to execute sensitive codes when the computer system is faultless, wherein the state information and the control information are repeatedly transmitted and received until the computer system is faultless.

Another aspect of the present invention provides a method for preventing hacking in a computer system, the method including: changing a state of at least one of a memory, a register, and a port in the computer system; calculating information on the changed state of the computer system; eliminating security threat elements from the computer system; transmitting, by the computer system, the state information to a quarantine station with guaranteed safety at any point in time; transmitting, by the quarantine station, control information calculated based on the state information to the computer system; and transmitting, by the quarantine station, security information required for executing sensitive codes to the computer system when the computer system is faultless, wherein the state information and the control information are repeatedly transmitted and received until the computer system is faultless.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 2 illustrates an operation mechanism of quarantine-station extension codes according to an exemplary embodiment of the present invention; and FIG. 3 illustrates an example in which quarantine-station extension to codes according to an exemplary embodiment of present invention operate.

DETAILED DESCRIPTION OF EXEMPLARY EMBODIMENTS

Figure 1:
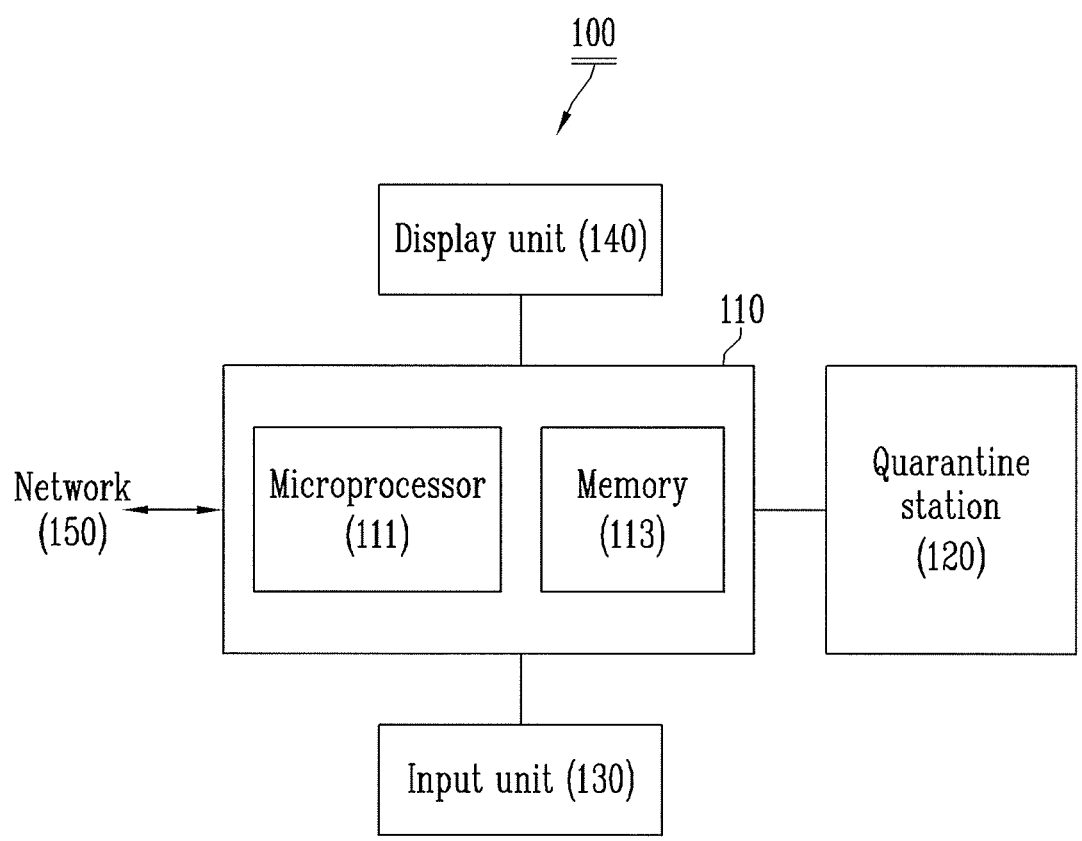
FIG. 1 illustrates a computer system 100 to which a quarantine station is connected according to an exemplary embodiment of the present invention.

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

The present invention proposes an apparatus and method for preventing hacking that forms a secure quarantine station to block attacks and prevent important information from being leaked by any means.

First, a system to which the present invention is applied will be described to assist in understanding the present invention. Then, the apparatus and method for preventing hacking according to the present invention will be described.

The present invention implements a state in which attacks can be essentially blocked by deriving a temporally and spatially separated area in a processor from a secure quarantine station. In the present invention, temporal separation implies that execution of quarantine-station extension code, which will be described later, is not interrupted, and spatial separation implies that integrity of the quarantine-station extension code is maintained between beginning and end of the execution. Also, the quarantine station has been guaranteed safety, and may be safety-verified code in a smart card, a peripheral component interconnect (PCI) card, or an internal memory.

FIG. 1 illustrates a computer system 100 to which a quarantine station is connected according to an exemplary embodiment of the present invention.

Referring to FIG. 1, the computer system 100 includes a host 110 for performing a process according to a schedule of an operating system (OS), and a quarantine station 120 with pre-guaranteed safety. Here, the host 110 transmits state information calculated at a predetermined point in time, and then the quarantine station 120 generates control information based on the state information and transmits the control information to the host 110.

This operation is repeatedly performed. When it is determined that there is no influence of malicious code, the quarantine station 120 transmits security information to the host 110 so that sensitive processing is performed in a temporal and spatial quarantine station in a microprocessor 111.

Although the quarantine station 120 is shown external to the host 110, it may be included in the host 110.

The host 110 includes the microprocessor 111 for performing a process executed according to a schedule of the operating system, and a memory 113 in which the executed program is stored. The quarantine station 120 generates the control information based on the state information received from the host 110, and transmits control information required to prepare a secure quarantine station in the microprocessor 111, to the host 110, and after iterating such a procedure sufficiently transmits security information to the host. Here, the security information may be a password for a program, a decryption key for program execution, a specific algorithm, etc.

An input unit 130 may include a keyboard, a mouse, or the like.

A display unit 140 displays operation of the host, such as a monitor.

In the present invention, quarantine-station extension code is used to prepare a secure area in the computer system 100 from the secure quarantine station 120.

The quarantine-station extension codes include state change code snippets, state calculation code snippets, security acquisition code snippets, communication code snippets with a verified quarantine station, and security objective code snippets.

The state change code snippet changes codes, and an arbitrarily selected portion in a memory and a register, and a port of the system. For example, the state change code snippet may change some codes in the memory 113 to change an instruction executed by the microprocessor 111.

The state calculation code snippet calculates a state value of the portion arbitrarily selected in the quarantine-station extension codes and the memory, registers and ports which are sensitive to security. The state value may be a checksum, hash, or medium access control (MAC) value which guarantee the integrity of wanted system state. In the present invention, this state value is referred to as state information.

The security acquisition code snippet securely sets registers of the processor and changes hardware registers. Also, the security acquisition code snippet changes and adds content of the memory, ports acting as a threat element, and executes codes for enhancing security to eliminate possible threat of attacks.

The communication code snippet is in communication with the reliable quarantine station 120 internal or external to the system, and transmits a current code state value, i.e., state information or receives values influencing operation of the quarantine-station extension code from the quarantine station 120. In the present invention, the values influencing operation of the quarantine-station extension codes are referred to as control information.

The security objective code snippet are codes to be executed in the resultant quarantine station, and perform desired operation using received important information after confirming non-attack by the quarantine station. The important information is necessary for normal code execution, such as codes itself or key information. In the present invention, the important information is referred to as security information.

That is, in the present invention, the quarantine-station extension codes are used to prepare an area without attacks in the microprocessor 111.

FIG. 2 illustrates operation of the quarantine-station extension codes according to an exemplary embodiment of the present invention, in which the quarantine-station extension code snippets CS0, CS1, . . . are executed and changed from an initial point in time, i.e., t=0 (220-0) to a point in time when the quarantine station is prepared in the microprocessor 111, i.e., t=n (220-n). Here, blocks 210, 211, and 213 denote the quarantine-station extension codes CS0, CS1, . . . , which are stored in the memory 113.

Referring to FIG. 2, when t=0 (220-0), the quarantine-station extension codes CS0, CS1, . . . are initialized. Here, the quarantine-station extension codes CS0, CS1, . . . may include state change code snippets, state calculation code snippets, security acquisition code snippets, communication code snippets with the quarantine station, and security objective code snippets.

The quarantine-station extension codes (CS0, CS1, . . . ) are executed and quarantine-station extension codes' region are changed over time. When the state change code snippet is executed, it operates to change an instruction executed by the microprocessor 111 so that new code snippets are created or some previous code snippets changed or deleted. Accordingly, the quarantine-station extension codes' region are changed while being executed.

The state calculation code snippets calculate state information of sensitive region in a current state, in which the state information may be one of several state values, such as checksum, hash, MAC, integrity check function value and the like. Sensitive parts can include memory for quarantine station extension part, debug registers and interrupt related registers.

The security acquisition code snippet gets system control to block attacks and performs operation such as interrupt halt.

When the communication code snippet is executed at a predetermined point in time while such code snippets are being executed, the quarantine-station extension code communicates with the quarantine station 120 with guaranteed safety. That is, when the communication code snippet is executed, state information of all or some of current codes, registers and ports is transmitted to the quarantine station 120. The state information may be randomly transmitted at a predetermined point in time ranging from t=0 (220-0) to t=n (220-n).

When it is determined that the received state information is normal and in time, the quarantine station 120 transmits control information calculated based on the state information, to the quarantine-station extension code. The control information is a value influencing the operation of the quarantine-station extension code, and may include various information, such as a branch point of the quarantine-station extension codes, some codes or a transmission point in time of the state information.

The quarantine station 120 then checks if the state information is correct and received at proper timing.

When t reaches n (220-$n$) in this repetitive process and then it is determined that the received state information is correct and in time, the quarantine station 120 determines that the microprocessor 111 is faultless and transmits security information to the quarantine-station extension codes so that security-required process begins. The security information enables the security codes to be normally executed, and may include important information, such as a decryption key for the security objective code, an algorithm of a specific program, or a password.

As described above, a temporal and spatially faultless state is formed inside the host using the secure quarantine station in order to block attacks and then important information is received, thereby preventing leakage of the important information.

FIG. 3 illustrates an example in which the quarantine-station extension codes according to an exemplary embodiment of the present invention operate.

Referring to FIG. 3, variables are initialized in step 301. In step 303, the state change code snippet creates a new random branch code snippet and run to the next snippet. In step 305, state calculation code snippet, when executed, updates accumulatively updated hash values with a hash value derived in a current state of all the codes. In step 307, communication code snippet passes the resultant hash value to the quarantine station 120 and receive the some control information. In step 309, random branch code snippet branches to a point selected based on the control information from the quarantine station and the accumulated hash value.

The quarantine-station extension codes naturally get the system control (e.g., to halt interruption) while performing this process, and eliminates possible security threat elements (e.g., inactivates a debugger register). Finally, in step 313, the quarantine-station extension codes receive important information necessary for security objective code snippet from the quarantine station 120 and executes the security objective code snippet. The security objective code snippet achieves a security objective by executing a security-required algorithm or getting key input from a user and protecting a user password through hashing of an input value.

When the security objective is achieved and the execution is completed, the security objective code snippet removes sensitive information that may remain in the memory or the register and passes the control to the OS in step 315.

The attacker must enable important information to be output from is the quarantine station in order to attack the security objective code. The simplest example of the security information as the important information may be a decryption key for the security objective code. The attacker must cause the quarantine station to believe that there is no intrusion into the system and normal execution is maintained. Accordingly, a hash value must be always maintained normally. Simultaneously, the attacker must continue to intervene in execution of codes for eliminating security threat elements. This is because normal execution of these codes obstructs the attack of the attacker.

One example of the security-threat-element elimination codes may be codes for preoccupying a system occupation right. When the occupation right is preoccupied (it is assumed that an interrupt or interrupt point setting-related register is set to a secure state), the attacker cannot attack. However, such intervention causes a change of the quarantine-station extension codes or the state of the system, leading to a changed state value to be delivered to the quarantine station, which makes resignation of normal important information transmission. The attacker must continue to intervene during the execution of the quarantine-station extension codes in order to block a change of the hash value due to the intervention.

As such, the attacker compensates for the influence of its intervention and causes the state calculation code snippets to output a state value prior to the intervention. The process of compensating for the influence of attacker's intervention yields additional cost (time) and the quarantine station 120 recognizes such cost and gives up providing important information.

In the entire process, the quarantine station 120 may transmit a value that may influence the state change of the quarantine-station extension code or security-related elements (break point-related register, interrupt related register, memory, port, and the like) in the system, to the quarantine-station extension codes at any time. This process causes static analysis performed by the attacker prior to the execution of the quarantine-station extension codes and attacks through the static analysis to be difficult.

The present invention may be applied, for example, to keyboard hacking protection. The present invention may also be applied to a system management mode or a multi-processor structure (e.g., a hyper threading or multi-core system) to allow for securer execution of the security objective codes.

The method for protect asset in the computer according to the present invention may be effectively applied to a processor that supports a system management mode or switching to other OS. And this method can be used to secure boot mechanisms.

The present invention can protect secret information and essentially protect assets such as algorithms or contents from malicious code. Specifically, the present invention can be applied to numerous applications, including implementation of a keyboard hacking protection scheme.

As described above, according to the present invention, a temporally and spatially faultless state is formed inside a computer using a secure quarantine station in order to block attacks and then important information is received, thereby preventing leakage of the important information. Thus, assets such as algorithms or contents, as well as secret information, can be essentially protected from malicious code.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for preventing hacking in a computer system having a processor, the apparatus comprising:
  a quarantine station configured to verify that no hacking exist; and
  a processor to execute at least one or more predetermined quarantine-station extension codes and a memory, the memory having stored thereon:

the quarantine-station extension codes configured to implement a state by the processor in which no attacks from hacking exist in the processor using the quarantine station, wherein hacking attacks relates to an unauthorized breaking into the computer system to at least one of having the ability to destroy data or changing a predetermined normal operation for the execution of at least one or more predetermined codes in the processor of the computer system, and wherein the state secures an area in the in the computer system to execute at least one or more predetermined quarantine-station extension codes in order to determine if the predetermined normal operation for the execution of the at least one or more predetermined codes in the processor of the computer system is executed without any influence due to hacking, wherein the secure area verifies that the at least one or more predetermined codes is not be interrupted in the processor due to any influence from hacking, and where the secure area verifies that the at least one or more predetermined codes are executed from beginning to end according to the predetermined normal operation for the execution of the at least one or more predetermined codes in the processor of the computer system without any influence due to hacking which is performed by in the area in the in computer system from the execution of the at least one or more predetermined quarantine-station extension codes prior to having any security information leaked due to hacking and transmit state information to the quarantine station, wherein a security information, calculated at least based on state information, is only provided from the quarantine station after verification that no hacking exist in the processor from the execution of the at least one or more predetermined codes in the processor of the computer system, wherein the state information and the security information are continuously transmitted or received while the computer system is operating without any influence due to hacking; and wherein the quarantine-station extension codes are stored in a memory and are changed while being executed by the processor.

2. The apparatus of claim 1, wherein the quarantine-station extension codes comprises:

a state change codes configured to change a state of at least one of a memory, a register, and a port in the computer system;

a state calculation codes configured to calculate information on the changed state of the computer system;

a security-threat-element elimination codes configured to eliminate security threat elements from the computer system;

a communication codes configured to transmit the state information calculated by the state calculation codes to the quarantine station, or receiving control information for controlling the computer system based on the state information, from the quarantine station; and a security execution codes configured to receive the security information from the quarantine station to execute a specific program when the computer system is without any influence due to hacking, wherein the state information and the control information are transmitted or received until the computer system is without any influence due to hacking repeatedly.

3. The apparatus of claim 2, wherein the state calculation codes calculates the state information using integrity check function value.

4. The apparatus of claim 2, wherein the control information is a value for changing the at least one of the memory, the register, and the port in the computer system.

5. The apparatus of claim 1, wherein the security information comprises information for executing contents or the program.

6. A method for preventing hacking in a computer system, the method comprising:

changing a state of at least one of a memory, a register, and a port in the computer system, wherein the change state is generated from the execution of at least one or more predetermined quarantine-station extension codes in order to determine if the predetermined normal operation for the execution of at least one or more predetermined codes in a processor of the computer system can be executed without any influence due to hacking, and wherein the hacking relates to an unauthorized breaking into the computer system to at least one of having the ability to destroy data or changing a predetermined normal operation for the execution of at least one or more predetermined codes in the processor of the computer system;

calculating information on the changed state of the computer system;

eliminating security threat elements from the computer system;

transmitting, by the computer system, a state information to a quarantine station, and wherein the quarantine station verifies that the execution of the at least one or more predetermined codes in the processor of the computer system can be executed without any influence due to the hacking;

transmitting, by the quarantine station, control information calculated based on the state information to the computer system; and transmitting, by the quarantine station, security information required for executing a specific program to the computer system only after predetermined codes of the specific program have been verified to be able to be executed by the processor of the computer system without any influence due to hacking, wherein the state information and the control information are continuously transmitted or received while the computer system is operating without any influence due to hacking.

7. The method of claim 6, wherein the state information comprises integrity check function value.

8. The method of claim 6, wherein the control information is a value for changing the at least one of the memory, the register, and the port in the computer system.

9. The method of claim 6, wherein the security information comprises information for executing contents or the program.

* * * * *